April 20, 1937. G. W. ENGSTROM 2,077,919
MUD SCRAPER FOR TRACTOR WHEELS
Filed June 14, 1935
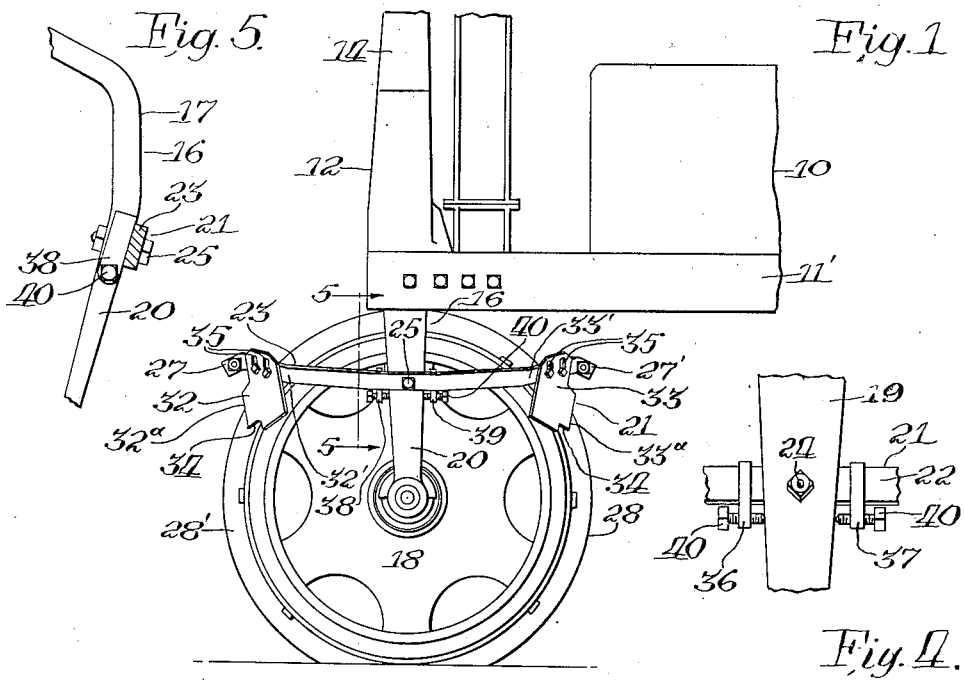
Inventor
Gustaf W. Engstrom Patented Apr. 20, 1937

2,077,919

UNITED STATES PATENT OFFICE 2,077,919

MUD SCRAPER FOR TRACTOR WHEELS

Gustaf W. Engstrom, Riverside, Ill., assignor to International Harvester Company, a corporation of New Jersey Application June 14, 1935, Serial No. 26,656

13 Claims. (Cl. 280—158)

This invention relates to a mud scraper attachment for the front wheel of a tractor of a well-known tri-cycle type.

The main object of the invention is to provide a mud scraper attachment for connection to the steering truck of the tri-cycle type of tractor and to adapt this mud scraper attachment for connection to the yoke of the steering truck.

Another object is to provide a mud scraper attachment in which the mud may be scraped from the wheel as the tractor is driven in a forward or reverse direction.

Another object is to provide the mud scraper attachment with means for adjusting the scraper blades.

Still another object is to include in the attachment scraping means for the skid ring of the dirigible front wheel.

In accomplishing the foregoing objects and other minor objects, which will hereinafter be more specifically described and then defined in the claims, the preferred forms of the improved details of structure are illustrated in the accompanying drawing, wherein:

Figure 1 is a side elevation of a tractor showing the front steering truck with the mud scraper attachment attached thereto;

Figure 2 is a front elevation of the tractor shown in Figure 1 with the mud scraper attachment in place;

Figure 3 is a section along the line 3—3 of Figure 2 looking in the direction of the arrows, showing the mud scraper attachment;

Figure 4 is an enlarged view along the line 4—4 of Figure 3 looking in the direction of the arrow;

Figure 5 is an enlarged view showing the adjusting bracket along the line 5—5 of Figure 1 looking in the direction of the arrows.

The invention is herein disclosed in combination with the single front truck wheel and skid ring of a tractor of the well-known tri-cycle type.

In the specific embodiment of the invention herein disclosed, the tractor 10 has forwardly extending channel members 11 and 11'. The forward ends of the side sills or members 11 and 11' are secured to a front bolster 12 formed with a central, vertical cylindrical bore 13, and the bolster has an upward extension formed with an upright tubular post 14 in alignment with the bore 13. The bore 13 and the post 14 contain bearings for the vertical shaft 15 of a dirigible truck 16 composed of the arched wheel frame 17 removably secured to the lower end of the shaft 15 and the steering truck wheel 18 journaled on an axle joining the lower ends of the outwardly bowed arms 19 and 20 of the arched wheel frame 17, as best shown in Figures 1 and 2. The upper end of the shaft 15 is suitably connected to a steering shaft extending towards the rear of the tractor and provided with a steering wheel in convenient position with respect to the operator's station on the tractor, so that the operator may steer the tractor by means of the steering wheel. The tractor power plant comprising the usual engine, radiator, fuel tank, etc., constituting the forward portion of the tractor, is supported on and between the side sills 11 and 11', and the steering shaft extends above these. Rotation of the steering shaft will transmit steering motion to the steering truck.

In order to prevent the mud from balling up on the dirigible steering truck wheel 18 and clogging between the bowed arms of the steering truck frame of bolster fork 17, a suitable mud scraper attachment 21 which is the main object of my invention has been attached to the steering truck frame 17, as best shown in Figures 1, 2, and 3. The mud scraper attachment 21 comprises suitable bow-shaped right and left hand supporting members 22 and 23, respectively. These members 22 and 23 respectively are secured to the right and left hand bow-shaped arms 19 and 20 and are pivotally mounted thereon about a horizontal axis by the bolts and studs 24 and 25 respectively. The front and rear portions of the bow-shaped members 22 and 23 are secured by the outwardly extending flange portions 26 and 27 and 26' and 27' which are removably fastened together, as best shown in Figure 3. Attached to the dirigible steering truck wheel 18 is the angle shaped skid ring 28. The right hand front and rear mud scraper blades 29 and 30 are secured to the mud scraper supporting portions 29' and 30', respectively, of the bow-shaped supporting member 22. The mud scrapers 29 and 30 are adjustably mounted to the mud scraper supporting portions 29' and 30' by the slots 31, as best shown in Figure 2. The mud scrapers 29 and 30 are so designed that they may be used either as a front or rear scraper respectively. The left hand front and rear mud scraper blades 32 and 33 respectively are secured to the scraper blade supporting portions 32' and 33' respectively of the bow-shaped member 23. The left hand front and rear mud scraper blades 32 and 33 respectively are suitably designed so that the scraper blades scrape the skid ring 28 as well as the dirigible wheel 18, as best shown by the notched portion 34 of Figures 1 and 2. The upstanding portion 28' of the skid ring 28 is suitably scraped by the edge portions 29a, 30a, 32a, and 33a of the scraper blades 29, 30, 32, and 33 respectively, as best shown in Figures 1 and 2. The left hand front and rear mud scraper blades 32 and 33 are likewise adjustably mounted on the scraper blade supporting portions 32' and 33' respectively by the adjusting slots 35 of the adjusting blades. The left hand front and rear mud scraping blades 32 and 33 are so designed that they may be used respectively either as the left hand front or rear scraping blades.

A further adjustment is provided for the mud scraping attachment 21, as best shown in Figures 1, 3, 4, and 5. In Figures 3, 4, and 5, the right hand and left hand supporting members 22 and 23 respectively are pivotally adjusted about the pivotal supports 24 and 25 respectively by means of the downwardly and inwardly extending brackets 36 and 37 which are secured by welding to the supporting member 22; and by the downwardly and inwardly extending brackets 38 and 39 respectively secured to the supporting member 23, as best shown in Figure 3. Set screws 40 are adjustably mounted on each of the brackets 36, 37, 38, and 39 below the pivotal supports 24 and 25 and the supporting members 22 and 23. The supporting members 22 and 23 may be adjusted upwardly or downwardly in a reciprocatory manner at the front and rear portions of the supporting members by adjustably moving the screws 40 in and out against the front and rear edges of the bow-shaped members 19 and 20 respectively and thus may be secured rigidly in adjusted position.

It will be evident that there has been provided a mud scraper attachment for the steering truck wheel of a tri-cycle type tractor which may be readily connected to or from the steering truck of the tractor, and that said attachment may be suitably adjusted for scraping the mud from the steering truck wheel or wheels, if two are used, and the skid ring of the steering truck wheel when the truck wheel is so equipped, as the tractor is driven either in a forward or rearward direction.

It is also evident that this type of scraper attachment may be applied to a tri-cycle type of tractor having a single upright bolster placed between and supporting dual steering wheels instead of the bolster fork and the single steering wheel.

It is to be understood that material suitable for the stresses encountered in an attachment of this nature are to be used. The preferred embodiment of the invention herein described is capable of certain modifications without departure from the scope of the invention to be defined in the following claims.

What is claimed is:

1. The combination with a tractor of the tri-cycle type having a front steering truck, said steering truck having a steering truck wheel supported in an arched wheel frame, of a scraper attachment comprising scraping means for scraping the aforesaid steering truck wheel, and means for supporting the aforesaid scraping means from the arched wheel frame.

2. The combination with a tractor of the tri-cycle type having a front steering truck, said steering truck having a steering truck wheel supported in an arched wheel frame and said wheel having a skid ring mounted thereon, of a scraper attachment comprising scraping means for scraping the steering truck wheel, scraping means for scraping the skid ring, and supporting means for supporting all the aforesaid scraping means from the arched wheel frame.

3. The combination with a tractor of the tri-cycle type having a front steering truck, said steering truck having a steering truck wheel supported in an arched wheel frame, of a scraper attachment comprising scraping means for scraping the aforesaid steering truck wheel, said scraping means comprising scraping blades mounted forwardly and rearwardly of the arched wheel frame whereby the steering truck wheel will be scraped as it moves in either direction, and supporting means for supporting the aforesaid scraping means from the arched wheel frame.

4. The combination with a tractor of the tri-cycle type having a front steering truck, said steering truck having a steering truck wheel supported in an arched wheel frame and said wheel having a skid ring mounted thereon, of a scraper attachment comprising scraping means for scraping the aforesaid steering truck wheel, said scraping means comprising scraping blades forwardly and rearwardly mounted with respect to the arched frame whereby the steering truck wheel will be scraped as it moves in either direction, scraping means for scraping the skid ring whereby the skid ring will be scraped as it moves in either direction, and supporting means for supporting the aforesaid scraping means from the arched wheel frame.

5. The combination with a tractor of the tri-cycle type having a front steering truck, said steering truck having a steering truck wheel supported in an arched wheel frame, of a scraper attachment comprising scraping means for scraping the aforesaid steering truck wheel, means for adjusting the scraping means, and supporting means for supporting the aforesaid scraping means from the arched wheel frame.

6. The combination with a tractor of the tri-cycle type having a front steering truck, said steering truck having a steering truck wheel supported in an arched wheel frame, of a scraper attachment comprising means for scraping the aforesaid steering truck wheel, supporting means for supporting the aforesaid scraping means from the arched wheel frame, and adjusting means for adjusting the aforesaid supporting means.

7. The combination with a tractor of the tri-cycle type having a front steering truck, said steering truck having a steering truck wheel supported in an arched wheel frame, of a scraper attachment comprising means for scraping the aforesaid steering truck wheel, means for adjusting the scraping means, supporting means pivotally mounted on the arched wheel frame for supporting the aforesaid scraping means, and adjusting means for adjusting the aforesaid supporting means.

8. The combination with a tractor of the tri-cycle type having a front steering truck, said steering truck having a steering truck wheel supported in an arched wheel frame, of a scraper attachment comprising means for scraping the aforesaid steering truck wheel, means for adjusting the scraping means, supporting means pivotally mounted on the arched wheel frame for supporting the aforesaid scraping means, and adjusting means for adjusting the aforesaid supporting means, said adjusting means comprising forwardly and rearwardly mounted adjusting means operatively engaging the arched wheel frame.

9. A scraper attachment, for tractors of the tri-cycle type having a front steering truck, said steering truck having a steering truck wheel supported in an arched wheel frame, comprising scraping means for scraping the aforesaid steering truck wheel, supporting means for supporting the scraping means, and means for securing the supporting means to the arched wheel frame.

10. A scraper attachment, for tractors of the tri-cycle type having a front steering truck, said steering truck having a steering truck wheel supported in an arched wheel frame, comprising a plurality of laterally spaced scraper supporting members, means for pivotally mounting the supporting members on the arched wheel frame, means for detachably securing the supporting members together at their front and rear ends, means for adjusting the supporting members, a plurality of scraper blades positioned on the scraper supporting members, said scraper blades being forwardly and rearwardly mounted on the supporting members whereby the steering truck wheel may be scraped as it travels in either direction, and means for adjusting the scraper blades on the scraper supporting members.

11. The combination with a tractor of the tri-cycle type having a front steering truck, said steering truck having a steering truck wheel supported from a wheel frame, of a scraper attachment comprising scraping means for scraping the aforesaid steering truck wheel, said scraping means comprising forwardly and rearwardly mounted scraping blades whereby the steering truck wheel will be scraped as it moves in either direction, and supporting means for supporting the aforesaid scraping means from the wheel frame.

12. The combination with a tractor of the tri-cycle type having a front steering truck, said steering truck having a steering truck wheel supported from a wheel frame, of a scraper attachment comprising means for scraping the aforesaid steering truck wheel, supporting means pivotally mounted on a horizontal axis on the wheel frame for supporting the aforesaid scraping means, means for adjusting the scraping means on the aforesaid supporting means, and adjusting means for adjusting the aforesaid supporting means.

13. The combination with a tractor of the tri-cycle type having a front steering truck, said steering truck having a steering truck wheel supported from a wheel frame, of a scraper attachment comprising means for scraping the aforesaid steering truck wheel, supporting means mounted on the wheel frame for supporting the aforesaid scraping means, means for adjusting the scraping means on the aforesaid supporting means, and adjusting means engaging said wheel frame for adjusting the aforesaid supporting means.

GUSTAF W. ENGSTROM.